(12) United States Patent
Madler

(10) Patent No.: US 7,866,671 B2
(45) Date of Patent: Jan. 11, 2011

(54) AUTOMATIC LEVELING VEHICLE

(76) Inventor: Herman Madler, 108 S. George, Mount Prospect, IL (US) 60056

( * ) Notice: Subject to any disclaimer, the term of this patent is extended or adjusted under 35 U.S.C. 154(b) by 61 days.

(21) Appl. No.: 12/351,945

(22) Filed: Jan. 12, 2009

(65) Prior Publication Data
US 2010/0176563 A1 Jul. 15, 2010

(51) Int. Cl.
*B60G 23/00* (2006.01)
(52) U.S. Cl. .............. 280/6.154; 280/5.508; 280/400; 180/41
(58) Field of Classification Search ............. 280/6.15, 280/6.154, 6.156, 6.155, 400; 180/41
See application file for complete search history.

(56) References Cited

U.S. PATENT DOCUMENTS

| | | | | |
|---|---|---|---|---|
| 315,567 A * | 4/1885 | Steward | .................... | 180/41 |
| 487,753 A * | 12/1892 | Koenig | .................... | 180/212 |
| 1,095,183 A * | 5/1914 | Beaman | .................... | 180/236 |
| 1,151,561 A * | 8/1915 | Bollinger | .................... | 280/6.155 |
| 1,353,393 A * | 9/1920 | Mathias | .................... | 180/41 |
| 1,363,327 A * | 12/1920 | Larsh | .................... | 280/6.154 |
| 1,374,784 A * | 4/1921 | Trimmer | .................... | 180/41 |
| 1,385,417 A * | 7/1921 | Cochrane | .................... | 180/41 |
| 2,458,400 A * | 1/1949 | Milliken | .................... | 180/41 |
| 2,583,250 A * | 1/1952 | Ball | .................... | 280/6.156 |
| 2,584,122 A * | 2/1952 | Gilmore | .................... | 114/61.16 |
| 2,786,541 A * | 3/1957 | Conrad | .................... | 180/41 |
| 2,792,234 A * | 5/1957 | Page | .................... | 280/400 |
| 2,872,200 A * | 2/1959 | Kroll | .................... | 280/6.156 |
| 2,883,777 A * | 4/1959 | Gurries et al. | .................... | 172/4.5 |
| 3,001,798 A | 9/1961 | Logan | | |
| 3,008,724 A * | 11/1961 | Lapins et al. | .................... | 280/6.156 |
| 3,052,480 A * | 9/1962 | Sanstrom | .................... | 280/6.156 |
| 3,292,943 A * | 12/1966 | Crockett | .................... | 280/104 |
| 3,309,097 A * | 3/1967 | Fritz | .................... | 280/5.508 |
| 3,313,555 A * | 4/1967 | Reimer | .................... | 280/104 |
| 3,480,098 A * | 11/1969 | Ward, Jr. | .................... | 180/41 |
| 3,506,079 A | 4/1970 | Madler et al. | | |
| 3,525,534 A | 8/1970 | Madler et al. | | |
| 3,792,748 A * | 2/1974 | Regier | .................... | 180/41 |
| 3,806,141 A * | 4/1974 | Janer | .................... | 280/6.156 |
| 3,917,306 A | 11/1975 | Madler et al. | | |
| 3,964,563 A * | 6/1976 | Allen | .................... | 180/217 |
| 3,976,302 A * | 8/1976 | Hammarstrand | .................... | 280/6.154 |
| 4,186,814 A * | 2/1980 | Hart | .................... | 180/24 |
| 4,416,109 A | 11/1983 | Slazas | | |

(Continued)

*Primary Examiner*—Ruth Ilan
*Assistant Examiner*—Nicole Verley
(74) *Attorney, Agent, or Firm*—Greer, Burns & Crain, Ltd.

(57) ABSTRACT

An automatic leveling vehicle comprising a front frame section and a rear frame section interconnected by a swivel joint which permits pivotable movement of the front frame section relative to the rear frame section about a generally horizontal axis extending longitudinally of the vehicle, a gear train attached to the rear frame section, right and left rear wheel assemblies, right and left rear axle assemblies operatively interconnecting the gear train, a lever arm connected to the gear train for controlling the position of the rear axle assemblies, selective movement of the lever arm causing the right and left rear axle assemblies to move their associated wheel assemblies up or down in opposite directions, a level detector for producing and applying leveling signals for positioning a lever arm control such that the rear frame section is maintained in a relatively level orientation when the rear wheel assemblies encounter an uneven terrain.

16 Claims, 5 Drawing Sheets

U.S. PATENT DOCUMENTS

| | | | | |
|---|---|---|---|---|
| 4,600,216 A | * | 7/1986 | Burkholder | 280/62 |
| 4,750,751 A | * | 6/1988 | Schafer | 56/16.5 |
| 5,755,382 A | * | 5/1998 | Skotinkov | 239/161 |
| 5,946,893 A | * | 9/1999 | Gordon | 56/15.8 |
| 6,131,919 A | * | 10/2000 | Lee et al. | 280/6.154 |
| 6,695,328 B2 | * | 2/2004 | Cope | 280/124.111 |
| 6,698,172 B2 | * | 3/2004 | Ferris et al. | 56/15.8 |
| 7,309,081 B1 | * | 12/2007 | Zuhlsdorf et al. | 280/781 |
| 7,425,004 B2 | * | 9/2008 | Donaldson | 280/6.156 |
| 7,494,141 B2 | * | 2/2009 | Bouton | 280/124.103 |
| 2005/0205329 A1 | * | 9/2005 | Fanger-Vexler | 180/234 |
| 2006/0220331 A1 | * | 10/2006 | Schafer et al. | 280/6.154 |
| 2008/0284118 A1 | * | 11/2008 | Venton-Walters et al. | 280/6.154 |

\* cited by examiner

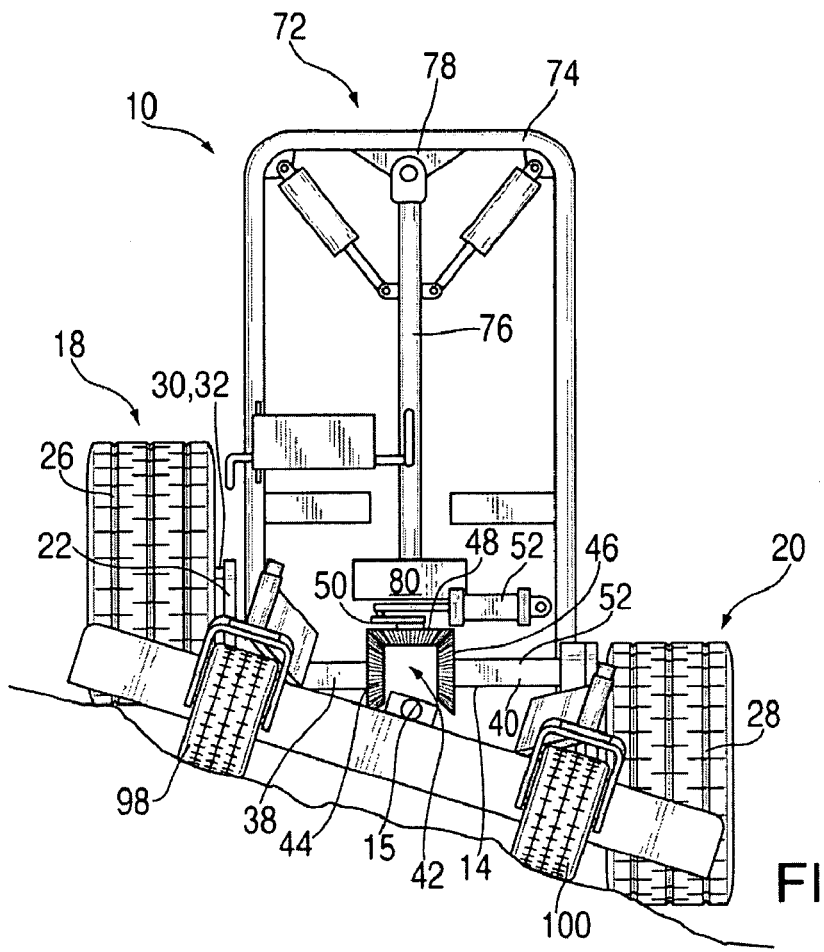
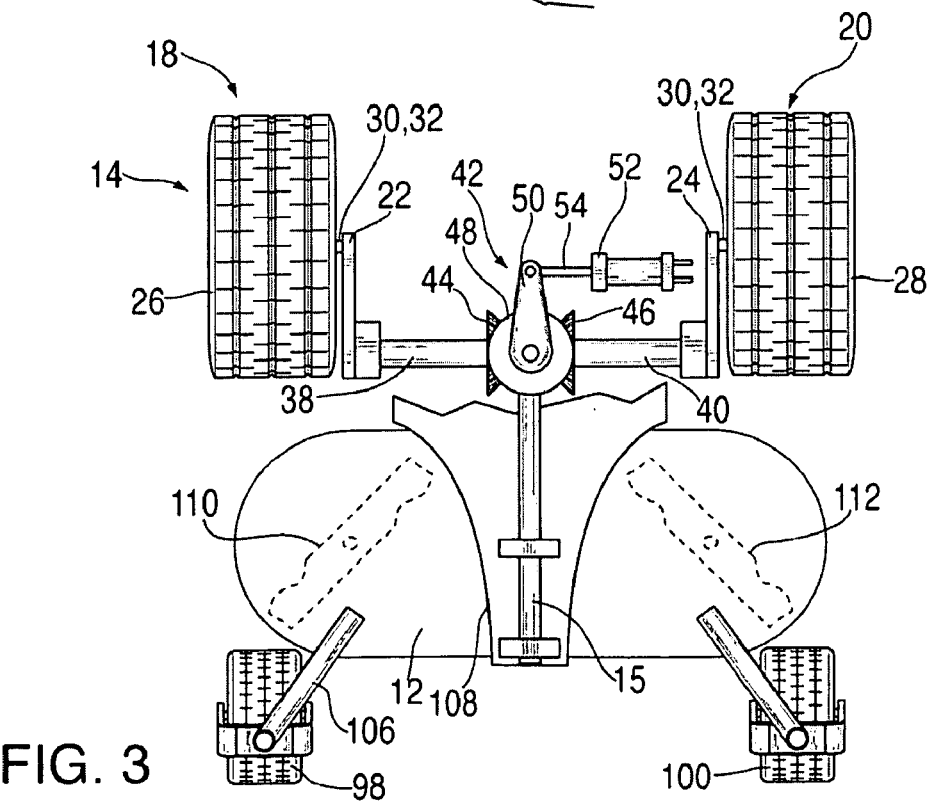
FIG. 2
FIG. 3

AUTOMATIC LEVELING VEHICLE

BACKGROUND OF THE INVENTION

This invention relates generally to an automatic leveling vehicle used to keep the vehicle's operator level when traveling on uneven terrain, and more particularly, to a terrain vehicle which maintains an operator portion of the vehicle body in a relatively level position even when the vehicle is traveling along a slanted grade or uneven terrain while allowing the front portion of the vehicle to remain parallel to the terrain.

Many vehicles have been designed to operate off of improved roadways and over uneven terrain. Such vehicles typically take the form of conventional tractors which have a rigid one-piece frame and a fixed wheelbase. When such a vehicle travels along a slanted grade, the wheels on one side of the vehicle are lower than the wheels on the other side of the vehicle, so the vehicle body necessarily adopts a tilted orientation roughly equal to the slanted grade of the ground. The tilted orientation of the vehicle body can be quite uncomfortable for the driver, particularly when the grade is steep. There is also a danger the vehicle will roll over.

Several embodiments exist in the art that are designed to keep the operator portion of a vehicle level when operating on slanted terrain. For example, a previous vehicle suspension system discloses interlocking rocking axels to compensate for an uneven surface. In another embodiment, the vehicle suspension system has left front and rear wheels mounted to a left rocking beam and right front and rear wheels mounted to a right rocking beam, with the beams pivotally attached to the sides of the frame. In this system, the frame is not maintained at a level orientation, only the amount of incline is reduced.

SUMMARY OF THE INVENTION

Embodiments of the present invention are directed to an automatic leveling vehicle comprising a front frame section and a rear frame section interconnected by a swivel joint which permits pivotable movement of the front frame section relative to the rear frame section about a generally horizontal axis extending longitudinally of the vehicle, a gear train attached to the rear frame section, a right rear wheel assembly and a left rear wheel assembly, a right rear axle assembly operatively interconnecting the gear train and the right rear wheel assembly, a left rear axle assembly operatively interconnecting the gear train and the left rear wheel assembly, a lever arm operatively connected to the gear train for controlling the position of the right and left rear axle assemblies; selective movement of the lever arm causing the right and left rear axle assemblies to move the right and left rear wheel assemblies up or down in opposite directions, a length-adjustable member operatively connected to the lever arm for positioning the same responsive to leveling signals applied thereto, a level detector for producing and applying leveling signals to the length-adjustable member, wherein the leveling signals cause the length-adjustable member to position the lever arm such that the rear frame section is maintained in a relatively level orientation when the rear wheel assemblies encounter an uneven terrain.

BRIEF DESCRIPTION OF THE DRAWINGS

FIG. 2 is a front elevational view of the vehicle traveling on a slanted grade;

FIG. 3 is an overhead plan view of the present automatic leveling vehicle without a portion of the frame assembly;

DETAILED DESCRIPTION OF THE EMBODIMENTS

The present automatic leveling vehicle addresses the drawbacks of conventional leveling vehicles. Specifically, the present automatic leveling vehicle maintains the operator platform at a relatively level orientation when the vehicle is traveling along a slanted grade or uneven terrain while still allowing the front portion of the vehicle to remain parallel to the terrain.

Therefore, when using the vehicle for an application such as mowing grass, the operator can remain in a level position while the mower deck remains parallel to the ground to avoid scalping of the lawn. An important feature of this invention is that when the vehicle is operating on uneven terrain, the automatic leveling detector and control means are operable to adjust the relative positions of the wheel assembly on each side of the rear portion so that the operator remains relatively level while the front portion of the vehicle remains parallel to the terrain. Additionally, the vehicle includes a central support axle to allow independent pivotal movement of the front position and rear body position.

More specifically, an automatic leveling vehicle including a front frame section and a rear frame section interconnected by a swivel joint which permits independent pivotable movement of the front frame section relative to the rear frame section about a generally horizontal axis extending longitudinally of the vehicle. Also included are a gear train attached to the rear frame section, a right rear wheel assembly and a left rear wheel assembly, a right rear axle assembly operatively interconnecting the gear train and the right rear wheel assembly, a left rear axle assembly operatively interconnecting the gear train and the left rear wheel assembly, and a lever arm operatively connected to the gear train for controlling the position of the right and left rear axle assemblies. Selective movement of the lever arm causes the right and left rear axle assemblies to move the right and left rear wheel assemblies up or down in opposite directions. Also included is a length-adjustable member operatively connected to the lever arm for positioning the same responsive to leveling signals and an automatic leveling detector for producing and applying leveling signals to the length-adjustable member. The leveling signals cause the length-adjustable member to position the lever arm such that the rear frame section is maintained in a relatively level orientation when the rear wheel assemblies encounter an uneven terrain.

Figure 1:
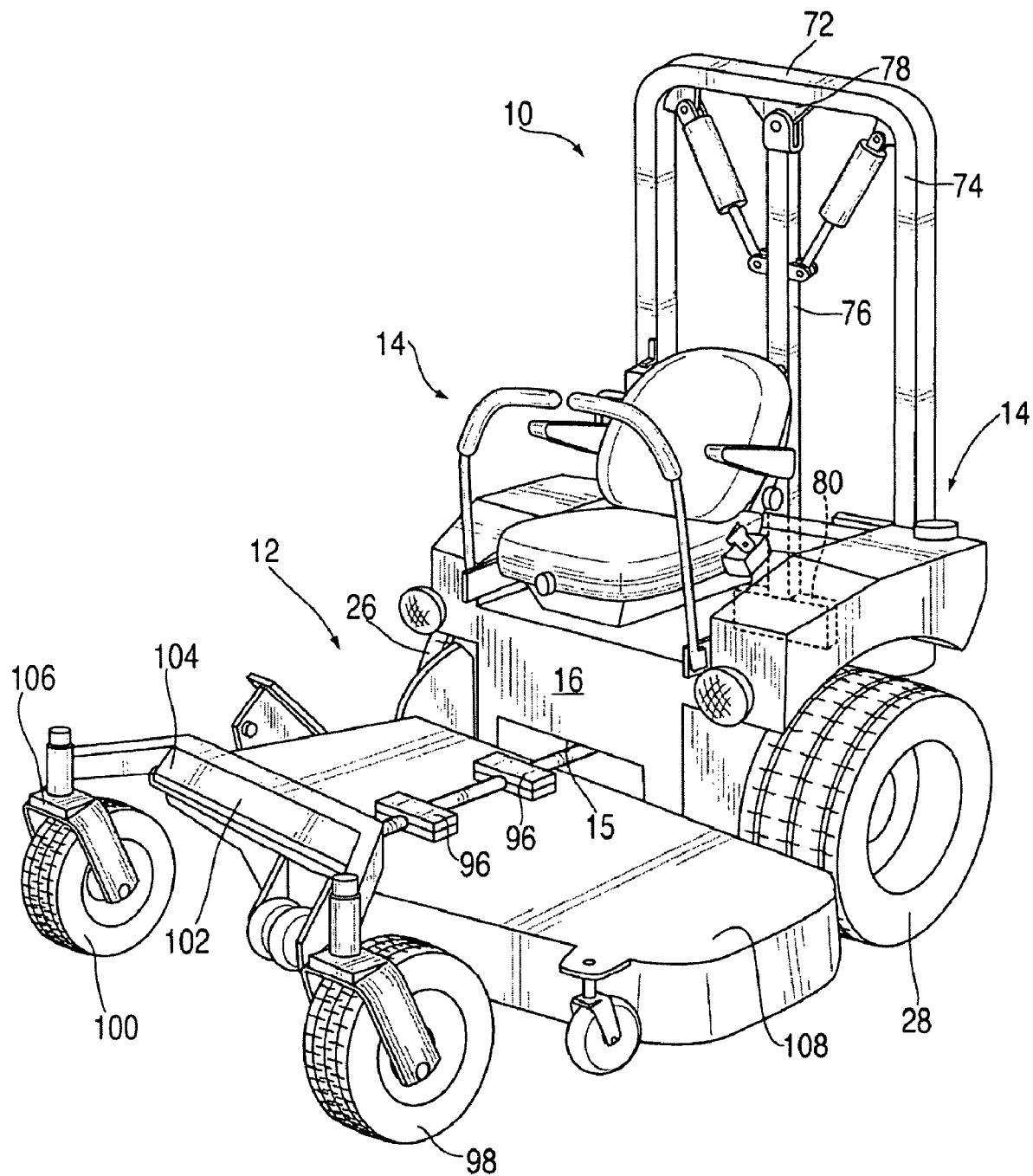
FIG. 1 is a front perspective view of the present automatic leveling vehicle.

Referring now to FIGS. 1-3, an automatic leveling vehicle incorporating the invention is indicated generally at 10 and includes a front frame section indicated generally at 12 and a rear frame section indicated generally at 14. The frame sections 12, 14 are interconnected by an axle support rod 15, such as a swivel joint, so that independent pivotal movement of the front frame section 12 is possible relative to the rear frame section 14 about a generally horizontal axis extending longitudinally of the vehicle. In addition, a vehicle body 16 is connected to the rear frame section 14 using brackets (not shown) or other suitable mounting structure as is known by those of ordinary skill in the art.

Figure 6:
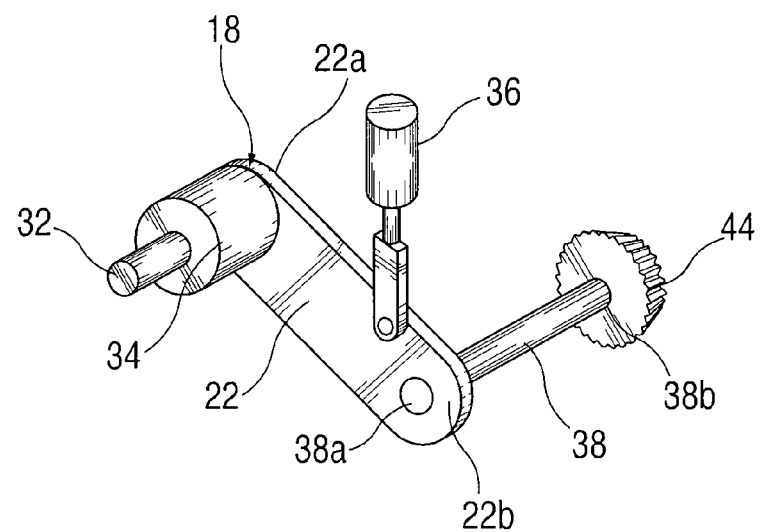
FIG. 6 is a partial front perspective view of the wheel assembly and the axle assembly of the present invention.

As shown in FIGS. 3, 4 and 6, the rear frame section 14 includes a right rear wheel assembly, indicated generally at 18 and a left rear wheel assembly, indicated generally at 20. As is best shown in FIG. 6 with regard to the right rear wheel assembly 18, each respective wheel assembly 18, 20 includes a frame support arm 22, 24 with a rear end 22a, 24a and a forward end 22b, 24b. The rear end 22, 24a is rotatably connected to a wheel 26, 28 by any suitable wheel mounting structure 30 such as a stub axle 32 or the like. In the preferred embodiment, the wheel mount 30 includes a hydraulic motor 34 connected to the frame arm rear end 22a, 24a for providing power to each wheel 26, 28. While not shown, the vehicle 10 preferably has a hydraulic drive system powered by an internal combustion engine, with the drive system including the necessary hydraulic hoses to power the motor 34 in a manner known by those of ordinary skill in the art. Each wheel assembly 18, 20 can also include a shock absorber 36, preferably connected to the frame arm rear end 22a, 24a.

Referring now to FIGS. 2 and 3, an elongated right rear axle 38 and an elongated left rear axle 40 operatively interconnect the right and left frame arms 22, 24 with a gear train, indicated generally at 42. In a preferred configuration, the axles 38, 40 are designed and configured to function as torsion springs, and therefore twist along the length of the axle about their axis. The amount of angular deflection is a function of the length of the axles 38, 40, as well as the diameter and the particular type and characteristics of steel from which they are made. While not specifically shown, it is preferred that opposite ends of the axles 38, 40 be journaled in bushings or the like so that they are rotatable and supported at their opposite end portions.

Figure 4A:
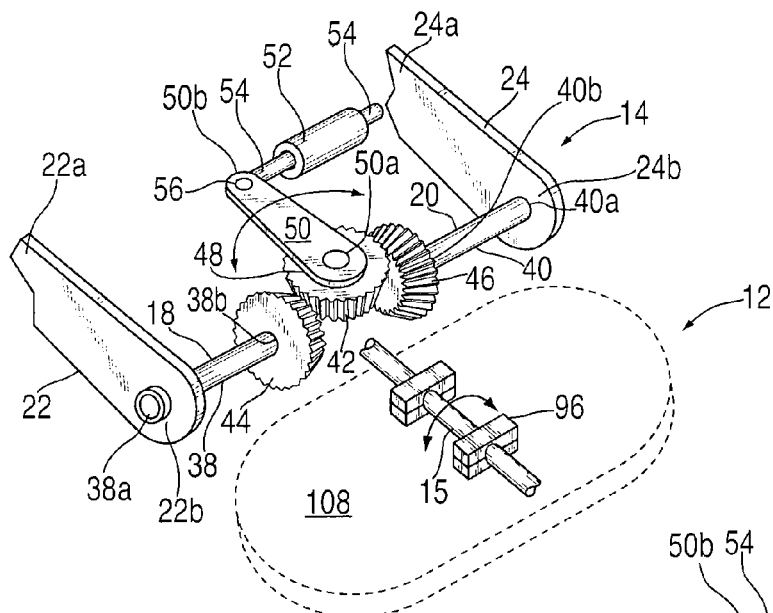
FIG. 4A is a front perspective view of the gear train of the automatic leveling vehicle where the vehicle is on level terrain.

As best shown in FIGS. 4A and 6, each rear axle outer end 38a, 40a is connected to the frame arm front end 22b, 24b, and each rear axle inner end 38b, 40b is attached to a bevel gear 44, 46. It should be understood that the frame arms 22, 24 and gears 44, 46 are fixed to the axles 38, 40 such that the attached frame arms and gears rotate about the axles. Therefore, when the gears 44, 46 are rotated in a particular direction, the axles 38, 40 will also rotate in that same direction. The amount of rotational movement of the frame arms 22, 24 is directly proportional to the amount of axle 38, 40 rotation.

The gear train 42, as shown in FIGS. 2-4, includes the right bevel gear 44, the left bevel gear 46 and a top bevel gear 48. The right gear 44 and left gear 46 are arranged perpendicular to the top gear 48 such that the teeth of the right and left gears intermesh with the teeth of the top gear. This arrangement causes the right and left gears 46, 48 to rotate in the opposite direction responsive to rotation of the top gear 48. More specifically, rotation of the top gear 48 in a clockwise direction, as viewed from above causes the right gear 44 (as viewed from the left side of the drawings shown in FIGS. 2 and 3) to rotate in the counterclockwise direction and the left gear 46 to rotate in the opposite or clockwise direction Further, the illustrated configuration has each of the bevel gears 44, 46 and 48 being approximately the same size, so that an amount of rotation of the right and left gears 44, 46 is directly proportional to the amount of rotation of the top gear 48. It should be understood that the top gear 48 may be larger or smaller than the right and left gears 44, 46, but that the right and left gears 44, 46 preferably are of the same size so that the frame arms 22, 24 move the same distance above or below a neutral or level wheel baseline. However, it should be realized that the amount of vertical movement above and below the neutral baseline can vary depending upon the length of the arms 22 and 24, the relative size of the top bevel gear 48 relative to the size of the bevel gears 44 and 46.

Figure 4B:
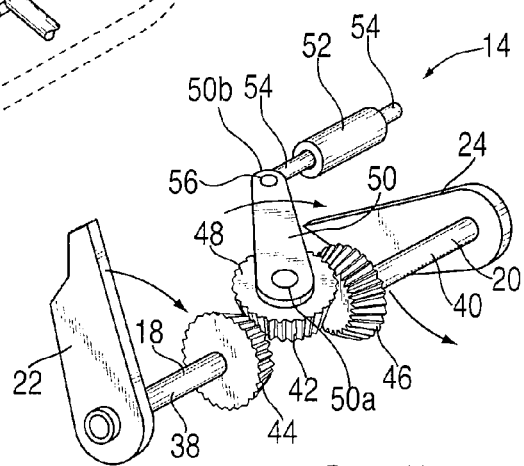
FIG. 4B is a front perspective view of the gear train of the automatic leveling vehicle and the vehicle is on uneven terrain and the left wheel is lower than the right wheel.
Figure 4C:
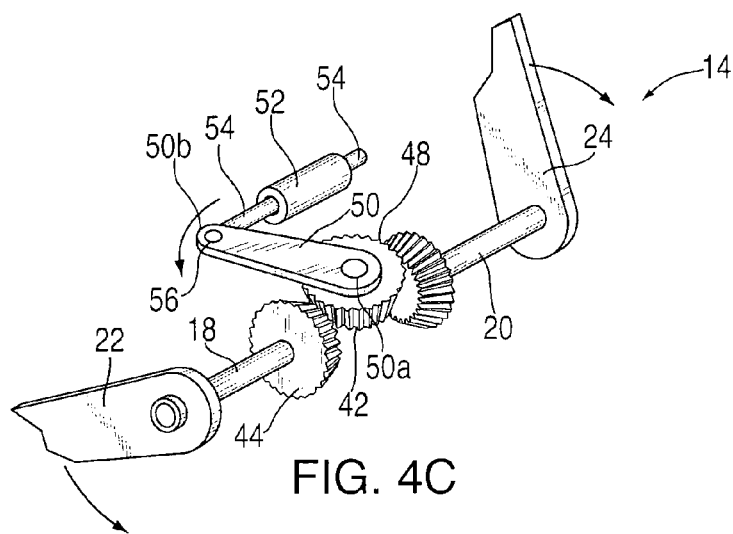
FIG. 4C is a front perspective view of the gear train of the automatic leveling vehicle where the vehicle is on uneven terrain and the left wheel is higher than the right wheel.

As best illustrated in FIGS. 4A, 4B and 4C, the top gear 48 is attached to a lever arm 50 having an inner end 50a secured to the top gear 48 such that rotation of the level arm 50 rotates the top gear 48. Additionally, the lever arm 50 has outer end 50b connected to a length-adjustable member 52. In the illustrated embodiment, the length-adjustable member comprises a hydraulic cylinder 52 that has an extendable and retractable rod 54. The cylinder 52 is preferably pivotably but securely attached to the frame 14 so that it has a small amount of movement so that angular or side forces will not be placed on the rod 54. The outer end of the rod 54 is preferably pivotably attached to the end 50b of the arm 50 by a pin 56 or the like. While the attachment of the cylinder 52 is not shown in any detail, its manner of attachment is well known to those of ordinary skill in the art. It should also be understood that other length-adjustable members 52 commonly used in the art are contemplated.

In the illustrated embodiment, and referring initially to FIG. 4A, the vehicle 10 is shown to be in a neutral baseline position where both arms 22 and 24 are level as would be the case when the vehicle is on flat horizontal terrain. In this position the lever arm 50 is generally perpendicular to the axles 38 and 40, and the rod 54 is partially extended from the cylinder 52.

Referring to FIG. 4B, when the rod 54 is retracted into the hydraulic cylinder 52, the arm 50 is moved in the clockwise direction as viewed from the top, which causes the right frame arm 22 to move above the neutral baseline position and the left frame arm 24 moves below it. Conversely, as shown in FIG. 4C, extension of the rod 54 from the hydraulic cylinder 52 causes the right frame arm 22 to move below the neutral baseline position and the left frame arm 24 to move above it. Such movement allows the wheels 26, 28 to remain in full contact with the ground surface while keeping the rear frame section 12 relatively level.

Figure 5:
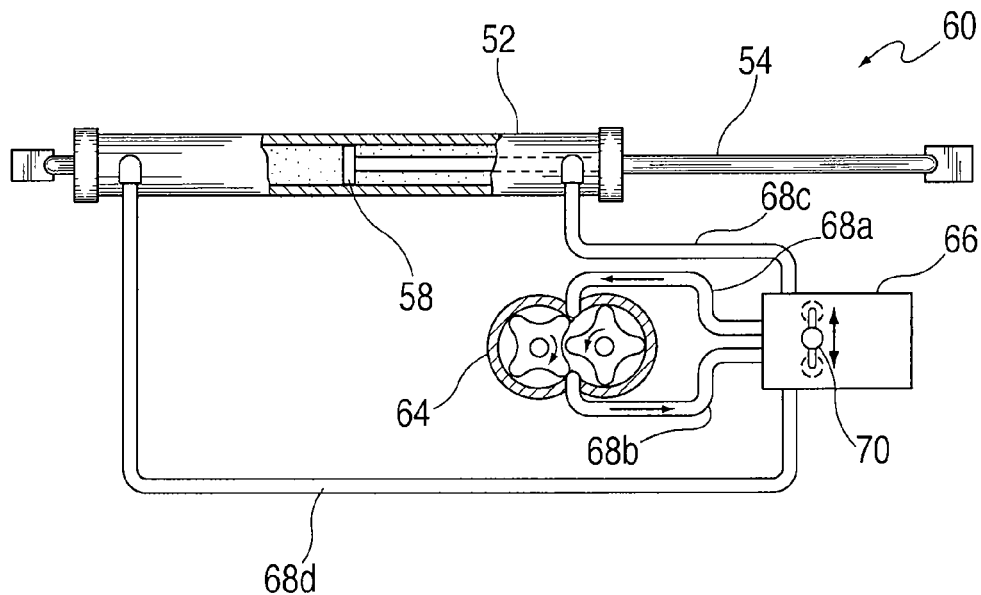
FIG. 5 is a top plan view of the hydraulic control system of the present invention.

As best shown in FIG. 5, a control device 60 is operatively associated with the hydraulic cylinder 52 for adjusting the relative positions of the frame arms 22 and 24 about the neutral baseline. The control device 60 adjusts the position of the rod 54 in the cylinder 52 so that an extension or retraction of the length-adjustable member respectively causes the frame arms 22 and 24 to move above or below the neutral wheelbase line. In this embodiment, the control device 60 is in the form of a hydraulic system that includes a hydraulic pump 64, a control valve 66 and hydraulic hoses 68a, 68b, 68c and 68d. The hoses 68a and 68b interconnect the pump 64 with the control valve 66 and hose 68c extends from the valve 66 to the forward end of the cylinder 52 and hose 68d extends from the valve 66 to the rear end of the cylinder.

The valve 66 is operable to selectively adjust the pressure of the hydraulic fluid in either the front or rear of the cylinder 52 which either extends or retracts the rod 54 relative to the cylinder 52. In various embodiments, the control valve 66 may be operated by the driver or may include a device for automatically controlling the pump 66. In one embodiment, the control valve 66 includes a lever 70 for manual operation to adjust the position of the rod 54 enabling the operator to selectively raise or lower either side of the vehicle 10 to conform to a particular terrain.

Figure 7:
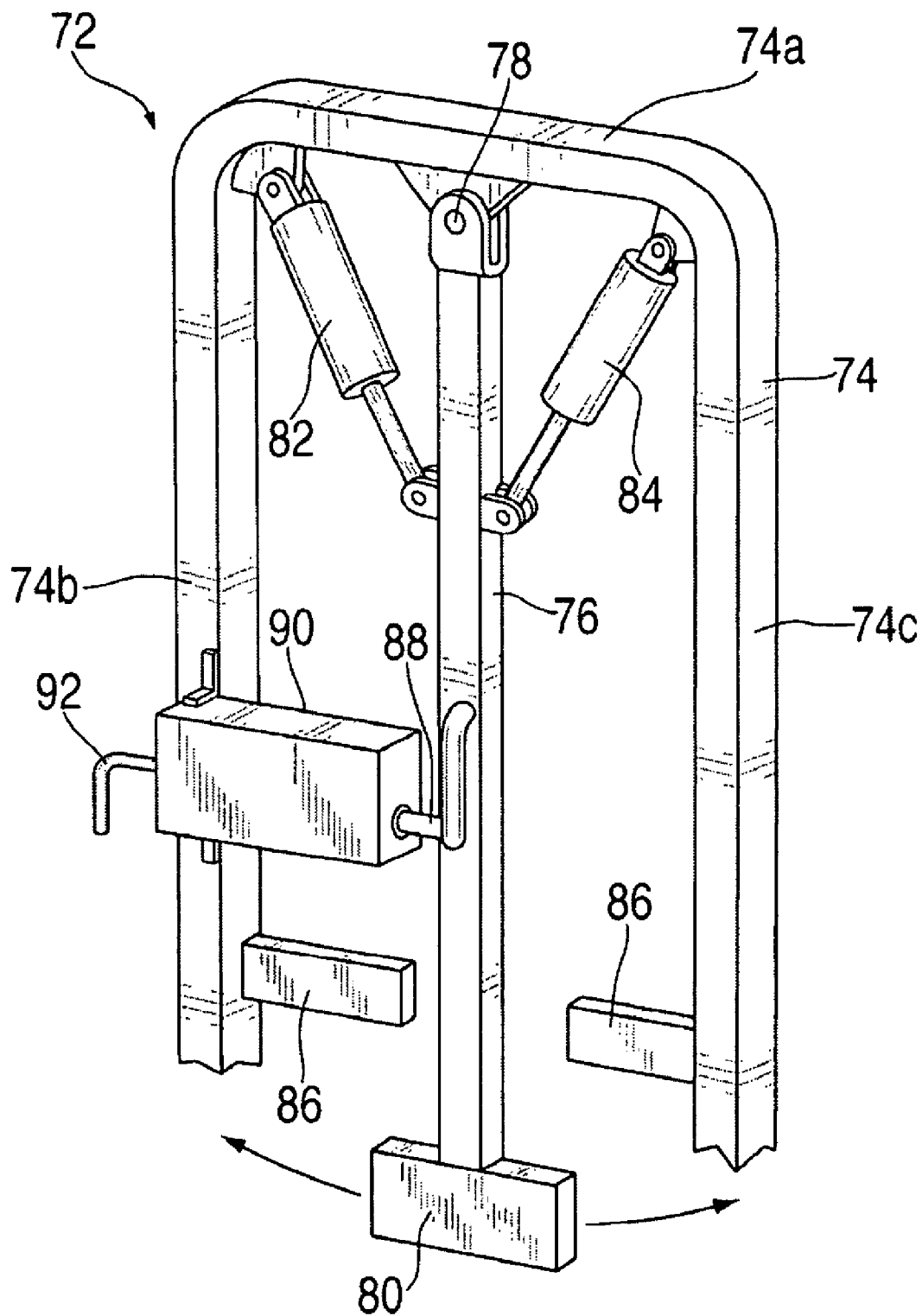
FIG. 7 is a perspective view of an automatic leveling detector for this invention.

Instead of operating the control device 60 manually, the control valve 66 can be configured to be connected to an automatic leveling system 72 for automatically adjusting the relative height of the right and left frame arms 22 and 24 and leveling the vehicle 10. In an embodiment shown in FIG. 7, the automatic leveling system 72 includes generally inverted, U-shaped pendulum support bar 74 which also serves as a roll bar for the vehicle 10. A pendulum 76 has its upper end connected to a top portion 74a of the support bar 74 by a pivot pin 78, which allows it to pivot in the lateral direction. The lower end of the pendulum 76 preferably includes a weight 80 for providing inertia to the pendulum 76 so that it does not move or change directions of movement quickly. In addition, a dampening structure in the form of air or hydraulic cylinders 82, 84 extend from the support bar 74 and are connected to the pendulum 76 for dampening movement of the pendulum in the lateral direction. The bar 74 has legs 74b and 74c which are provided with a pair of stops 86 for limiting lateral movement of pendulum 76.

A translation member 88 is operatively connected to pendulum 76 for translating lateral movement of the pendulum into corresponding actions of the control valve 68 to level the vehicle 10. In the embodiment shown in FIG. 7, the translation member 88 takes the form of a moveable piston structure connected to the pendulum 76 and being slidably received in a control box 90. As the horizontal axis of the vehicle 10 tips in either direction, the pendulum 76 will correspondingly move and result in a movement of the piston structure 88 within the control box 90. The control box 90 is operatively connected to the control valve 66 by a line 92 and provides input signals to the control valve 66 for controlling movement of the hydraulic cylinder 52. In particular, if the pendulum 76 tilts in one direction in response to the vehicle 10 traversing uneven ground, the piston 88, control box 90 and line 80 will provide a signal to control valve 66 to raise that side of the vehicle and lower the other side of the vehicle. Thus, the vehicle body 14 where the operator is located is kept at a relatively level orientation. Other automatic leveling systems 72 may also be employed in the vehicle 10 of the present invention, such as using a mercury switch which can detect if the vehicle is out of level and send an appropriate electrical signal to the control device 60 for automatically leveling the vehicle.

Referring now to FIGS. 1-3, the front frame section 12 is interconnected to the rear frame section 14 by the axle support rod 15. In this embodiment, the axle support rod 15 is rotatably attached to the front frame section 12 using brackets 96. The support rod is preferably securely attached to the rear frame section 14. However, other connection methods as known in the art are contemplated. This configuration permits independent pivotal movement of the front frame section 12 relative to the rear frame section 14 about a generally horizontal axis extending longitudinally of the vehicle 10.

A left front wheel 98 and right front wheel 100 are connected to the front frame section 12 by a front suspension system show generally as 102. The front suspension system 102 can be any known conventional suspension system and will vary based on application. In the embodiment show in FIG. 1, the front suspension system includes a longitudinal strut 104 connected to the front frame section 12. The front wheels 98, 100 are connected to the longitudinal strut via a trunion 106.

Referring now to FIGS. 1-3, the present embodiment includes a cutter deck 108 attached to the front frame section 12 for mowing grass or the like. The cutter deck 108 includes a right blade 110 and left blade 112 and attaches to the front frame section 12 using brackets or other suitable mounting devices. In this application, the front suspension system 102 is preferably configured so that the cutter deck 108 height is consistent relative to the mowed surface.

Operation as the vehicle 10 traverses uneven terrain will be described in connection with FIG. 2. When the vehicle 10 travels along the surface of a slanted grade, the automatic level detector 72 sends a signal to the control device 60 indicating the direction and magnitude of adjustment of the frame arms 22, 24 needed to keep the operator in a relatively level position. The hydraulic cylinder 52 then moves the lever arm 50 based on the signal sent from the control device 60. In this example, the top gear 48 rotates in a counterclockwise motion causing the left frame arm 22 to move above the neutral wheel baseline position and the right frame and 24 to move below the neutral baseline position. Once the frame arms 22, 24 adjust, the rear 26, 28 wheels move up and down against the terrain to keep the rear frame 14 and operator at a level position. At the same time, the front frame 12 remains parallel to the terrain by pivoting on the axle support rod 15.

From the foregoing, it is evident that that the rear frame section 14 of the vehicle 10 will stay in a relatively level position while allowing the front frame section 12 to stay parallel to the terrain. This is particularly important when the vehicle 10 includes a cutter deck 108 and must stay parallel to the terrain to achieve uniform cutting of grass.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An automatic leveling vehicle comprising:
a front frame section and a rear frame section interconnected by a swivel joint which permits pivotable movement of said front frame section relative to said rear frame section about a generally horizontal axis extending longitudinally of the vehicle;
a left front wheel and a right front wheel connected to said front frame section;
a right rear wheel assembly and a left rear wheel assembly connected to said rear frame section;
a gear train attached to said rear frame section;
a right rear axle assembly operatively interconnecting said gear train and said right rear wheel assembly;
a left rear axle assembly operatively interconnecting said gear train and said left rear wheel assembly;
a lever arm operatively connected to said gear train for controlling the position of said right and left rear axle assemblies; selective movement of said lever arm causing said right and left rear axle assemblies to move said right and left rear wheel assemblies up or down in opposite directions;
a length-adjustable member operatively connected to said lever arm for positioning the same responsive to leveling signals applied thereto;
a level detector for producing and applying leveling signals to said length-adjustable member;
wherein said leveling signals cause said length-adjustable member to position said lever arm such that said rear frame section is maintained in a relatively level orientation when said rear wheel assemblies encounters an uneven terrain.

2. The automatic leveling vehicle of claim 1, further comprising a cutter deck assembly coupled to said front frame section such that said cutter deck assembly obtains independent pivotable movement relative to the rear frame section about an axis extending longitudinally of the vehicle.

3. The automatic leveling vehicle of claim 1, wherein said length-adjustable member comprises a hydraulic cylinder, a piston rod and a head.

4. The automatic leveling vehicle of claim 3, wherein the length of said length-adjustable member is adjusted by a hydraulic system comprising:
   hydraulic fluid;
   a plurality of hydraulic hoses;
   a hydraulic pump;
   and a control valve;
   wherein said hydraulic pump is operable to selectively increase the pressure of said hydraulic fluid in said cylinder by moving said hydraulic fluid though said control valve to said cylinder though said plurality of hydraulic hoses.

5. The automatic leveling vehicle of claim 1, wherein said level detector is located on a support bar attached to said rear frame section.

6. The automatic leveling vehicle of claim 5, wherein said automatic leveling means further comprises:
   a pendulum connected to the top portion of said support bar;
   a translation member operatively connected to said pendulum for translating lateral movement of said pendulum into corresponding action to level said vehicle; and
   a control box to send signals to said length-adjustable member for controlling movement of said wheel assemblies.

7. The automatic leveling vehicle of claim 1, wherein said right rear wheel assembly and said left rear wheel assembly each further comprise a shock absorber mounted thereon.

8. The automatic leveling vehicle of claim 1, wherein said right rear wheel assembly and said left rear wheel assembly each further comprise a hydraulic motor for rotating said wheel.

9. The automatic leveling vehicle of claim 1, wherein each said rear wheel assembly further comprises a wheel, an arm including a first end and a second end, said first end connected to said wheel and said second end rotatably attached to said second end of said axle assembly.

10. The automatic leveling vehicle of claim 1, wherein each of said axles function as a torsion spring.

11. The automatic leveling vehicle of claim 10 wherein each of said axles is made of a solid generally cylindrical metal.

12. The automatic leveling vehicle of claim 1, wherein said gear train comprises:
   a right gear;
   a left gear; and
   a top gear;
   wherein said right gear and said left gear are arranged perpendicular to said top gear and grooves of said right and left gears intermesh with grooves of said top gear.

13. The automatic leveling vehicle of claim 1 wherein extension of said length-adjustable member causes said right wheel assembly to move below a neutral wheelbase line and said left wheel assembly to move above the neutral wheelbase.

14. The automatic leveling vehicle of claim 1 wherein retraction of said length-adjustable member causes said right wheel assembly to move above a neutral wheelbase line and move said left wheel assembly to move below the neutral wheelbase.

15. A vehicle operator leveling system comprising:
   a gear train;
   a right elongated axle and a left elongated axle, said axles operatively interconnected to said gear train and a right frame arm and a left frame arm;
   a lever arm operatively connected to said gear train for controlling the position of said right and left frame arms; selective movement of said lever arm causing said axles to rotate and said right and left frame arms to move up or down in opposite directions;
   a length-adjustable member operatively connected to said lever arm for positioning the same responsive to leveling signals applied thereto;
   a hydraulic control system for producing and applying leveling signals to said length-adjustable member;
   wherein the leveling signals cause said length-adjustable member to retract or extend such that said frame arms move up or down to keep the vehicle operator in a level orientation.

16. An automatic leveling vehicle comprising:
   a front frame section and a rear frame section interconnected by a swivel joint which permits pivotable movement of said front frame section relative to said rear frame section about a generally horizontal axis extending longitudinally of the vehicle;
   a gear train attached to said rear frame section;
   right and left rear wheel assemblies attached to said rear frame section;
   right and left rear axle assemblies operatively interconnecting said gear train;
   a lever arm connected to said gear train for controlling the position of said rear axle assemblies, selective movement of said lever arm causing said right and left rear axle assemblies to move their associated wheel assemblies up or down in opposite directions;
   a lever arm control mechanism for selectively positioning said lever arm; and
   a level detector for producing and applying leveling signals for positioning said lever arm control such that said rear frame section is maintained in a relatively level orientation when said rear wheel assemblies encounter an uneven terrain.

* * * * *